US012434786B2

United States Patent
Mercat

(10) Patent No.: US 12,434,786 B2
(45) Date of Patent: Oct. 7, 2025

(54) ELECTRIC ASSIST DEVICE FOR A BICYCLE

(71) Applicant: MAVIC GROUP, Chavanod (FR)

(72) Inventor: Jean-Pierre Mercat, Chavanod (FR)

(73) Assignee: MAVIC GROUP, Chavanod (FR)

( * ) Notice: Subject to any disclaimer, the term of this patent is extended or adjusted under 35 U.S.C. 154(b) by 1101 days.

(21) Appl. No.: 17/294,245

(22) PCT Filed: Nov. 14, 2019

(86) PCT No.: PCT/FR2019/000186
§ 371 (c)(1),
(2) Date: May 14, 2021

(87) PCT Pub. No.: WO2020/099737
PCT Pub. Date: May 22, 2020

(65) Prior Publication Data
US 2022/0001956 A1    Jan. 6, 2022

(30) Foreign Application Priority Data
Nov. 15, 2018  (FR) ..................... 18 71997

(51) Int. Cl.
*B62M 6/55*   (2010.01)
*B62J 45/20*  (2020.01)
(Continued)

(52) U.S. Cl.
CPC ............... *B62M 6/55* (2013.01); *B62J 45/20* (2020.02); *B62J 45/411* (2020.02); *B62M 6/50* (2013.01);
(Continued)

(58) Field of Classification Search
CPC ........ B62M 6/55; B62M 6/50; B62M 11/145; B62J 45/20; B62J 45/411; F16D 41/30; F16D 43/22
See application file for complete search history.

(56) References Cited

U.S. PATENT DOCUMENTS 7,938,242 B2 *   5/2011  Chen ..................... F16D 41/30
                                                          74/576
9,802,673 B2 *  10/2017  Hayslett ............... B62M 11/145
(Continued)

FOREIGN PATENT DOCUMENTS

CA    2 711 069 A1    1/2012
CN    1093994 A      10/1994
(Continued)

OTHER PUBLICATIONS

International Search Report issued on Jan. 21, 2020 in PCT/FR2019/000186 filed on Nov. 14, 2019, citing references AA, AB, AO, and AP therein, 2 pages.
(Continued)

*Primary Examiner* — Anne Marie M Boehler
(74) *Attorney, Agent, or Firm* — Oblon, McClelland, Maier & Neustadt, L.L.P.

(57) ABSTRACT

An electric assist device for a bicycle comprising a shaft coupled in rotation with a pair of cranks and being able to be rotated in a positive direction by an electric motor, a connection mechanism being placed between the motor and the shaft, which connection mechanism has at least three distinct states. The states includes State 1, termed assist state, in which the motor transmits a torque to the shaft via a drive part which rotates at the same speed as the shaft, State 2, termed freewheel state, in which the rotation of the shaft in the positive direction is greater than that of the drive part, and State 3, termed disconnection state, in which a
(Continued)

rotation in the positive direction or in the negative direction of the shaft cannot cause the motor to rotate.

17 Claims, 12 Drawing Sheets

(51) Int. Cl.
  *B62J 45/411* (2020.01)
  *B62M 6/50* (2010.01)
  *B62M 6/90* (2010.01)
  *B62M 11/02* (2006.01)
  *F16D 41/30* (2006.01)
  *F16D 43/22* (2006.01)

(52) U.S. Cl.
  CPC ............. *B62M 11/02* (2013.01); *F16D 41/30* (2013.01); *F16D 43/22* (2013.01); *B62M 6/90* (2013.01)

(56) References Cited

U.S. PATENT DOCUMENTS

| | | |
|---|---|---|
| 2012/0083383 A1 | 4/2012 | Steuer et al. |
| 2012/0097467 A1* | 4/2012 | Maeno ................... B62M 11/16 180/206.7 |
| 2012/0312618 A1 | 12/2012 | Chan |
| 2014/0221151 A1* | 8/2014 | Hino ....................... B62M 6/55 477/5 |
| 2017/0029065 A1* | 2/2017 | Hayslett ............... B62M 11/145 |
| 2017/0240247 A1* | 8/2017 | Hinterkausen ......... B62M 25/08 |
| 2017/0305499 A1 | 10/2017 | Hinterkausen et al. |
| 2020/0086947 A1* | 3/2020 | Doeppner .............. B62M 11/02 |
| 2020/0255082 A1* | 8/2020 | Hendey .................. B62K 11/02 |

FOREIGN PATENT DOCUMENTS

| | | | | |
|---|---|---|---|---|
| DE | 102010047165 A1 * | 4/2012 | ............ | B62M 11/16 |
| DE | 10 2014 221 514 A1 | 4/2016 | | |
| GB | 2312403 A * | 10/1997 | .......... | B62M 11/145 |
| WO | WO 2016/177494 A1 | 11/2016 | | |

OTHER PUBLICATIONS

Combined Chinese Office Action and Search Report issued Oct. 19, 2022 in Chinese Patent Application No. 201980075442.3 (with English translation of Office Action only), citing references 1, 15, and 16 therein, 10 pages.

* cited by examiner

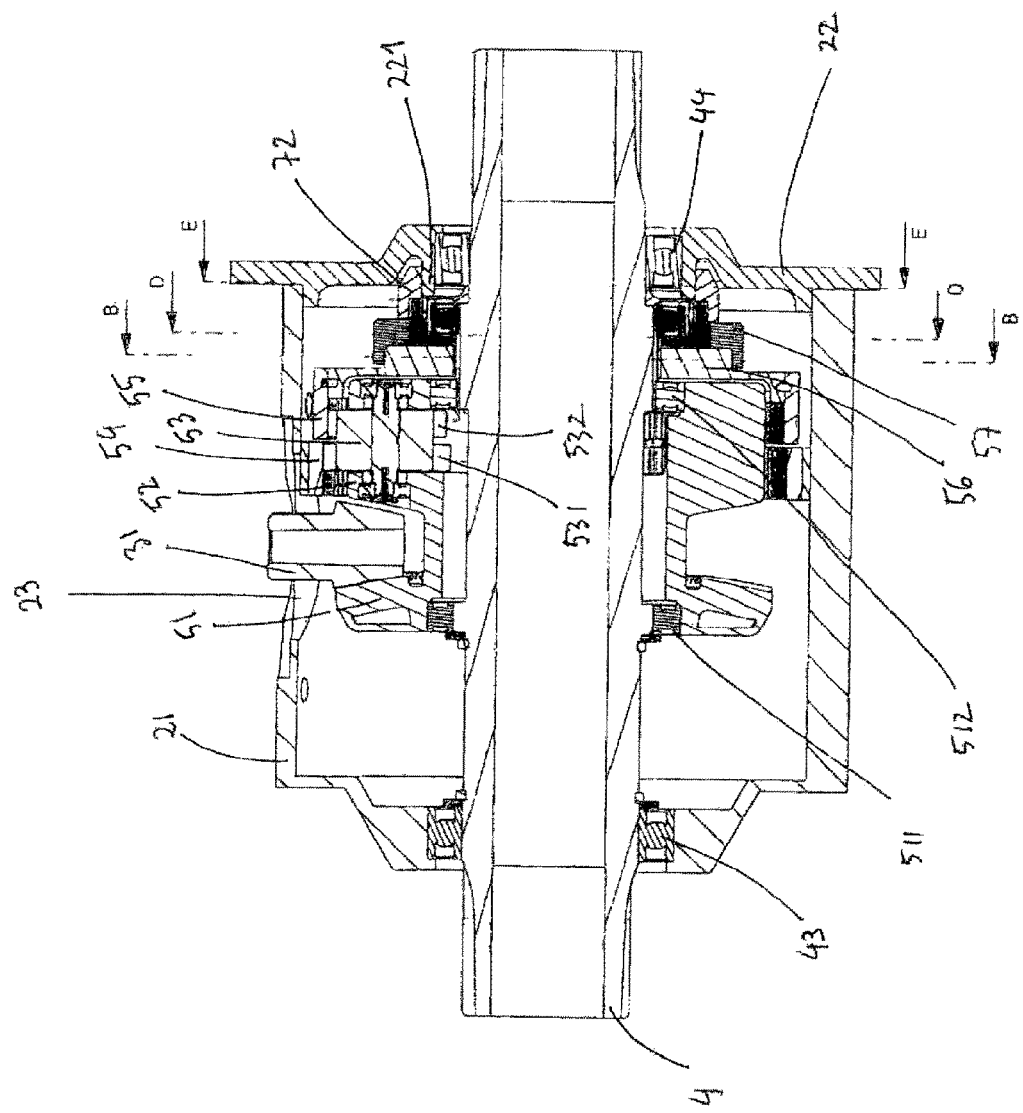

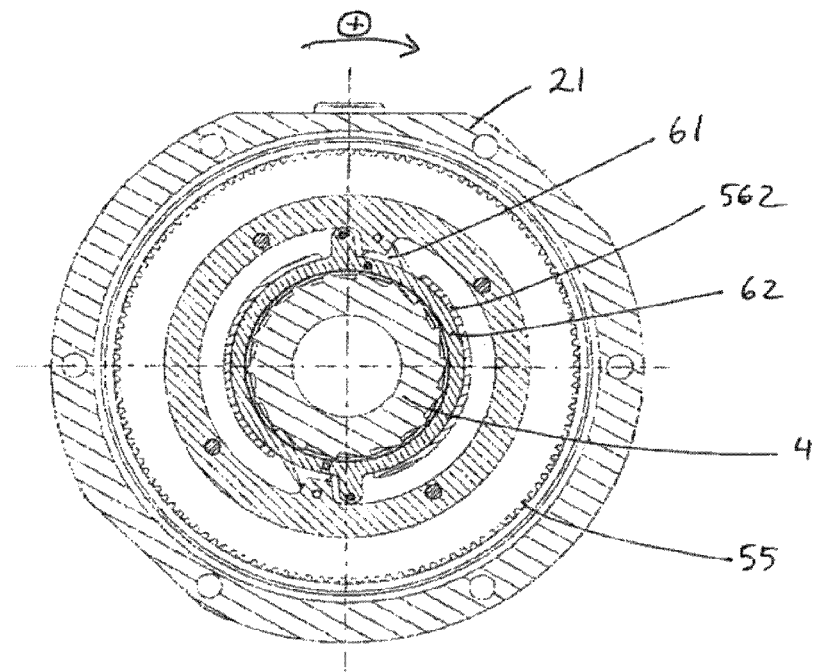
CROSS SECTION D-D Fig. 6
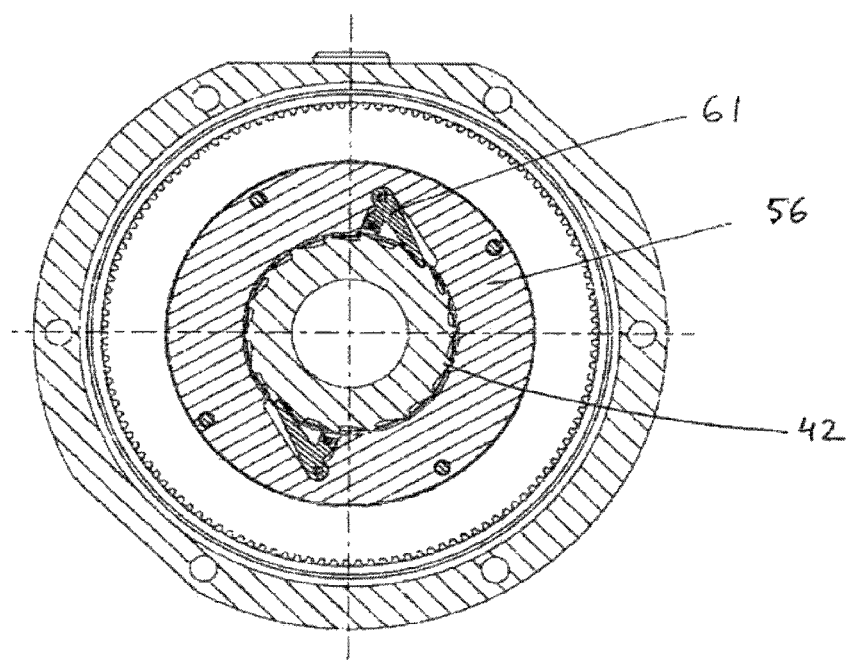
CROSS SECTION B-B Fig. 7

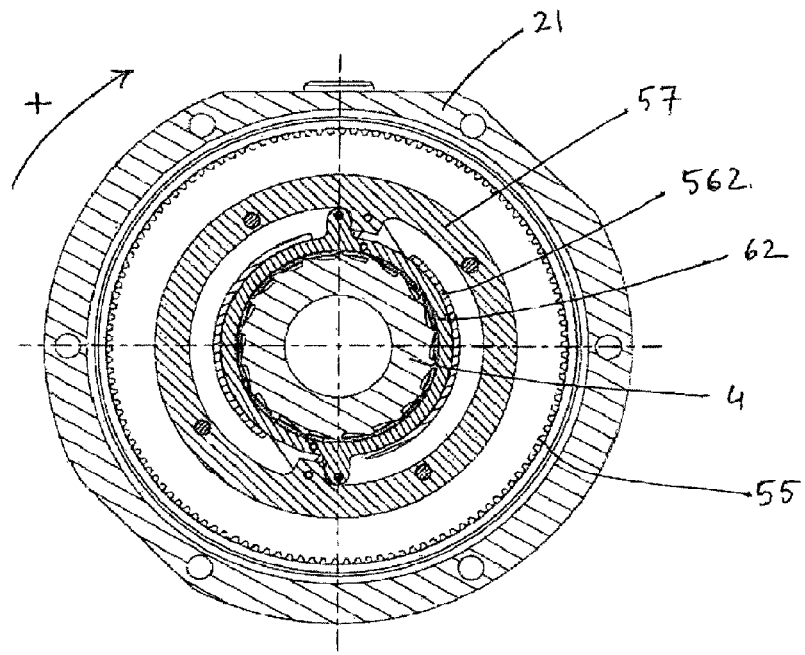
CROSS SECTION D-D  Fig. 8
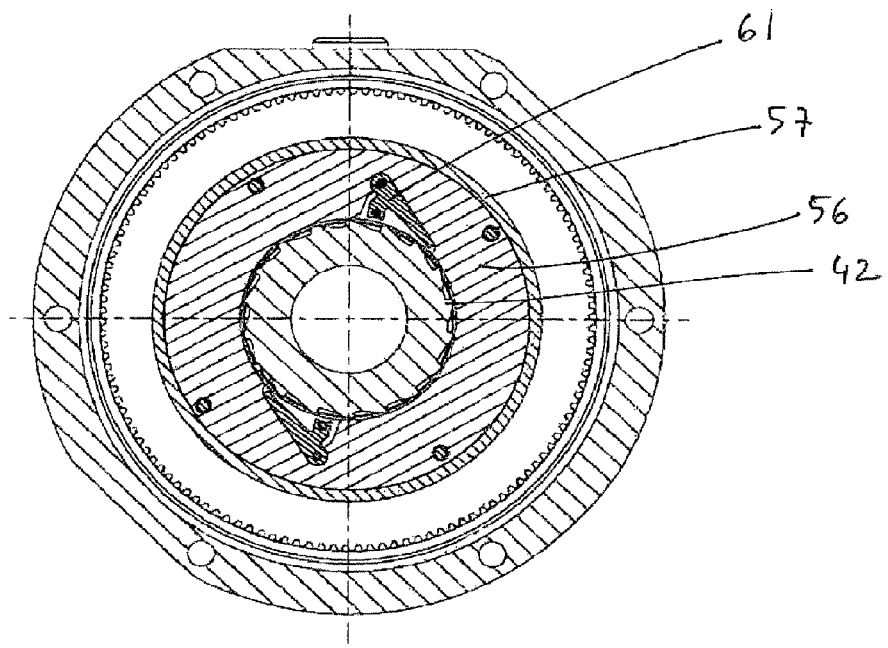
CROSS SECTION B-B  Fig. 9

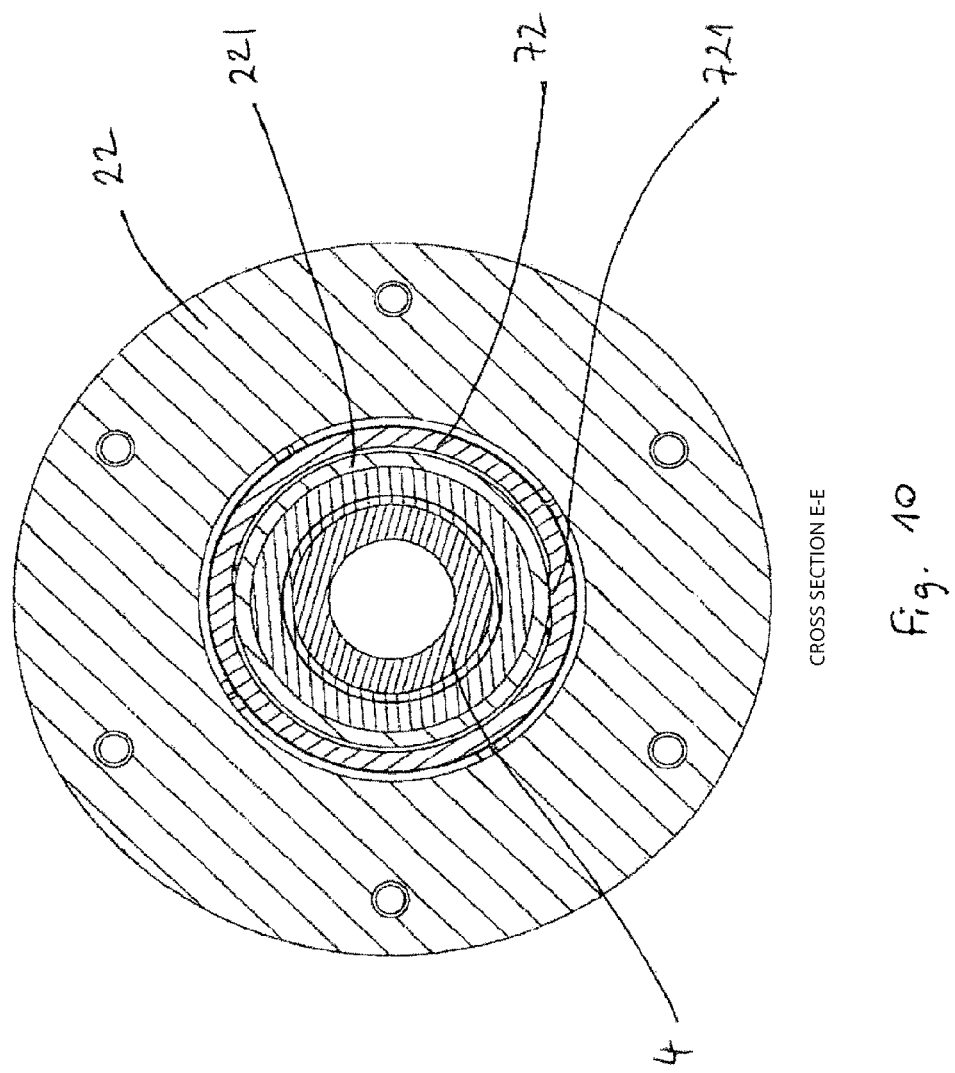

ELECTRIC ASSIST DEVICE FOR A BICYCLE

TECHNICAL FIELD OF THE INVENTION

The invention relates to bicycles equipped with an electric assist motor. More particularly, the invention relates to the torque transmission means between the assist motor and the transmission chain of the bicycle.

BACKGROUND OF THE INVENTION

The particular feature of an electric assist bicycle is that it needs to have two power transmission pathways: a crankset-wheel pathway which transmits the torque generated by the cyclist, and a motor-wheel pathway. These two transmission pathways need to be able to be superimposed because, by principle and to meet regulations, the motor must supply a torque to the wheel only insofar as the cyclist, him or herself, via the crankset, also supplies a torque to the wheel.

Different electric assist bicycle configurations are now available, and the present invention relates more particularly to the bicycles for which the assist motor is placed in the central part of the bicycle by being notably incorporated in the crankset.

In the use of an electric assist bicycle, various distinct functional phases have to be considered: unassisted pedaling (phase 1), assisted pedaling (phase 2), pedaling at a speed of rotation greater than the maximum speed of rotation generated by the motor (phase 3), abrupt stopping of pedaling by the cyclist (phase 4) and backpedaling (phase 5).

During unassisted pedaling, the behavior of the bicycle, for the cyclist, has to resemble as closely as possible that of a bicycle without motor, that is to say that everything which is necessary to the assistance such as the electric motor, the mechanical reducing gear or any other transmission member must neither add additional friction, nor generate additional noise, nor add additional inertia.

To this end, it is common practice to insert a freewheel device in series in the transmission pathway between the motor and the wheel. Traditional bicycles, that is to say those without electric assist, are also practically all already equipped with a freewheel mechanism between the crankset and the wheel. Consequently, it is necessary to provide two freewheel devices, each being placed in one of the two distinct transmission pathways: motor-wheel and crankset-wheel.

It should also be noted that there are two major freewheel principles, ratchet freewheels which are lightweight but have a tendency to be noisy and friction freewheels transmitting the torque by adhesion with the advantage of being silent, of having a very low angle of engagement but that have the drawbacks of being heavy and bulky, of requiring extremely precise workmanship making them fairly costly and of having a residual friction torque that is often high in freewheel mode through the engagement prestress exerted on the friction cams or needles.

During assisted pedaling (phase 2), the motor-wheel transmission pathway is to be operational. The crankset-wheel transmission pathway must also be operational.

In the case of a bicycle with central motor, it is common practice to design the bicycle in such a way that the motor-wheel transmission pathway and the crankset-wheel transmission pathway share as many elements as possible in common. Generally, the motor and the pedals drive a common chain ring which is linked to the wheel by a conventional bicycle chain with links. In this case, the motor must be able to be connected mechanically to impart a motor assist torque to the crankset or to the chain ring.

When, in this assisted pedaling phase, the cyclist wants to pedal faster than the maximum motor speed, the motor must be disconnected in order for the cyclist not to be slowed down by the motor (phase 3). This is why a simple freewheel is placed at the output of the motor. Generally, these freewheels are of two types, ratchet or roller.

Each of these types of freewheel has drawbacks. A ratchet freewheel can become noisy whereas a roller freewheel will indeed be silent but will be heavy and will generate a higher friction torque in the freewheel phase.

When the cyclist wants to stop pedaling abruptly (phase 4), it will be necessary, for comfort and safety reasons, for: the motor cutoff reaction time to be very short and for the inertia of the motor and of its transmission chain to be reduced to avoid continuing to drive the legs of the cyclist or continue to move the bicycle forward when the cyclist wants to stop instantaneously. This is unfortunately not always what happens for the bicycles of the prior art.

For example, in the prior art U.S. Pat. Nos. 9,616,969 and 8,757,311, as on most of the electric assist bicycles, the disclosed driving chain ring is driven in parallel via a first freewheel by the crankset making it possible to transmit the pedaling torque of the cyclist and via a second freewheel by the assist motor making it possible to transmit the assist torque from the electric motor. With such an arrangement, if the cyclist suddenly stops pedaling, the legs of the cyclist will not be driven in rotation because the first freewheel of the crankset will be declutched and he or she will be able to immediately stop pedaling. On the other hand, the motor will continue to drive the bicycle on its way for the time it takes to decelerate which can be hazardous if the cyclist wants to stop in an emergency.

In other configurations, for example in EP 2 502 819, the chain ring is not driven in parallel by two distinct freewheels because the chain ring is directly connected with the cranks so that when the cyclist decides to suddenly stop pedaling, he or she must also stop the entire transmission chain of the motor. And, since stopping this motor transmission pathway takes a certain time, the pedals will continue to turn for this short time period and drive the legs of the cyclist. This is a disagreeable sensation which is detrimental to the comfort and to the quality of the experience of the cyclist. Also, when the cyclist stops pedaling suddenly, he or she may create a very high braking torque on the transmission chain of the motor which may cause it to be degraded or break.

Finally, there is a last functional phase in the use of an electric assist bicycle which poses a problem in certain configurations (phase 5). The first of these configurations is when the cyclist wants to pedal backward to reposition his or her pedals, for example when approaching a turn in order for them not to rub against the road or when the cyclist wants to start and position his or her driving foot in a substantially horizonal position.

There is a second configuration during which reversing occurs, and that is when maneuvering the bicycle to put it away. Indeed, if the bicycle is moving in reverse, the transmission freewheel of the rear wheel will be blocked and drive the pedals backward. During this phase, that can be called backpedaling, the electric assist bicycles comprising a simple freewheel, for example a ratchet freewheel, in the motor-wheel transmission pathway, will also have this freewheel block in reverse and consequently drive the motor in reverse. The reverse rotation of the motor generates a high friction torque and a very high equivalent inertia. In this case, the cyclist can supply a high backpedaling torque, which will provoke a high negative angular acceleration and therefore a very high negative torque because of the significant equivalent inertia of the motor, which risks destroying the gears of the gear motor. Also, on this type of motor drive, the reduction ratio between the speed of rotation of the motor and the speed of rotation of the crankset shaft is of the order of 100, which inevitably reduces the efficiency of this type of reducing gear, the reducing gear can even become irreversible and block as soon as a minor lubrication or wear fault appears and that is why the patent WO 2016/128789 incorporates a torque limiter which makes it possible to disconnect the motor in case of an excessively high torque to avoid breaking the teeth.

This backpedaling phase is, in addition, often applied in store when purchasing the bicycle. Indeed, it is standard practice, among veteran cyclists, to turn the cranks in reverse to estimate the friction losses of the transmission chain (including the friction of the crankset seals and bearings, of the chain and of its rollers and of the rolling bearings of the rear freewheel), which makes it possible to estimate the transmission friction quality. When performing this test on an electric assist bicycle with simple freewheel, the freewheel is blocked in reverse and drives the motor in reverse and, as the reduction ratio between the motor and the crankset is high, the motor is therefore driven in reverse at a high speed of rotation, thus increasing the sensation of inertia and generating a high friction torque due to the mechanical and electromagnetic frictions of the motor which are multiplied by the high reduction ratio and by the inverse of the efficiency of the reducing gear, therefore making this reverse testing very negative.

The freewheels used in the electric assist bicycles of the prior art are simple freewheels that block when a positive motor torque is applied to the input element (assist motor) and which is then transmitted to the output element (crankset shaft). On the other hand, the freewheel does not make it possible to transmit a negative torque in the opposite direction on the same input element and will then start to turn freely in this freewheel direction. Thus, everything takes place as desired when the direction of rotation is the normal direction of use, but, when the direction of rotation is reversed on the output element, the crankset shaft, everything is reversed, that is to say that the freewheel will be blocked and transmit reverse torque thus driving the entire transmission chain in reverse, which presents the drawbacks listed above.

The objective of the invention is to provide an electric assist bicycle which does not exhibit the drawbacks of the bicycles of the prior art. In particular, the objective of the invention is to propose an electric assist device for a bicycle which operates optimally in the different functional phases described above. The objective of the invention is also to propose an assist device which exhibits silent operation and with extremely reduced friction. The objective of the invention is also to propose an assist device which is the least bulky and the least heavy possible.

SUMMARY OF THE INVENTION

The objective of the invention is achieved by the provision of an electric assist device which comprises a declutchable connection device which allows for the automatic declutching of the motor in backpedaling phase while receiving no resistance and while not risking breaking the reducing gear during this phase without the need to add a torque limiter as in the prior art cited above.

The objective of the invention is achieved by the provision of an electric assist device for a bicycle comprising a shaft secured in rotation with a pair of cranks and that can be driven in rotation in a positive direction by an electric motor, wherein a connection mechanism is placed between the motor and the shaft, which connection mechanism having at least three distinct states:
  state 1, called assist state, in which the motor transmits a torque to the shaft via a driving piece which turns at the same speed as the shaft,
  state 2, called freewheel state, in which the rotation of the shaft in the positive direction is greater than that of the driving piece,
  state 3, called disconnection state, in which a rotation in the positive direction or in the negative direction of the shaft cannot drive the rotation of the motor.

The objective of the invention is notably achieved by the provision of an electric assist device for a bicycle comprising a shaft that can be driven in rotation in a positive direction simultaneously by a pair of cranks and by an electric motor, said device comprising a clutch mechanism which is placed between the motor and the shaft, comprising a closed position in which the motor and the shaft are secured in rotation bidirectionally, and an open position in which a rotation of the shaft in a negative direction does not drive the rotation of the motor, said open position being effective when the motor has a zero rotational speed.

It will be noted that, in the context of the invention, a difference of principle is made between a freewheel and a clutch mechanism. Indeed, a clutch mechanism is a mechanical coupling device which, when it is in "closed" position, secures in rotation, in both directions, a first element with a second element. A freewheel, for its part, allows both the element 2 (driven element) to be driven by the element 1 (driving element) in a first relative direction of rotation, called positive direction; and allows a relative rotation without driving, in the positive direction of the element 2 with respect to the element 1. In this latter case, the element 2 turns faster, in the positive direction, than the element 1. On the other hand, its specific construction also allows the driving in the negative relative direction of rotation of the element 1, by the element 2, which then becomes the driving element.

The objective of the invention is also achieved by the provision of an electric assist device that has one or more of the following features, in any technically acceptable combination:
  the cranks are fixed to the two ends of the shaft,
  a reducing gear is placed between the motor and the shaft so as to reduce the speed of rotation of the motor,
  the reducing gear comprises a gear train,
  the reducing gear is of epicyclic type,
  the connection mechanism comprises a freewheel which is placed between the motor and the shaft, said freewheel allowing the motor to drive the shaft in the positive direction and allowing the shaft to drive the motor in the negative direction,
  the freewheel is placed between the reducing gear and the shaft and the freewheel comprises blocking pieces that are displaced (notably pivoting pawls) between an "engaged" position and a "disengaged" position, and whose distal ends can engage with teeth integral to the shaft when the pawls are in lowered position.

The objective of the invention is also achieved by an electric assist method for a bicycle equipped with a device as described in the preceding paragraphs and comprising, in addition, a microcontroller which controls the rotation of the motor in a first direction, called positive direction, when assistance is desired, said positive direction being such that it generates the forward motion of the bicycle; characterized in that, when the speed of rotation of the cranks is zero or when the latter turn in the direction opposite to the forward motion of the bicycle, the microcontroller controls the rotation of the motor in the direction opposite the first direction, for a short time period. This short time period is less than a few seconds, preferably less than one second. Its purpose is in fact to generate the rotation of a few degrees to ensure the relative rotation of the synchronizing ring with respect to the driving ring.

In an embodiment of the invention, the connection mechanism comprises a declutchable freewheel. One of the ways of obtaining this result consists in equipping the connection mechanism with means allowing the pawls of the freewheel to be kept in disengaged position. These means which allow the pawls to be kept in disengaged position can comprise a ratchet synchronizing ring and a friction ring, secured to one another, said friction ring coming into contact with a fixed part of the assist device so as to generate a friction torque during its rotation. The friction ring is an elastically deformable ring bearing with prestress on the fixed part of the device on at least two zones evenly distributed over the circumference of the fixed part. The fixed part can for example be a cylindrical barrel. Upon a rotation of the friction ring in the positive direction, the latter generates a torque which tends to engage the pawls and, conversely, upon a rotation in the negative direction, the friction ring generates an opposite torque which tends to disengage the pawls.

In this first configuration embodiment of the invention, when the connection mechanism is in the disconnection state (state 3), the freewheel is no longer operational. That will correspond to the functional phases 1, 3 and 4, as described above.

The declutchable freewheel system according to the invention is a more sophisticated freewheel which is connected to three bodies (instead of just two in a simple freewheel), there is an input and an output but also a third, reference body linked to the fixed frame of the bicycle, which will make it possible to manage the freewheel blocking/unblocking function with a relative speed condition with respect to the frame of the bicycle.

Thus, when the crankset turns in the normal direction of rotation, the freewheel will operate as a simple freewheel. On the other hand, as soon as the assist motor turns in reverse, the freewheel will tend to be disconnected thereby preventing the motor from being able to be driven in rotation in reverse by the shaft of the crankset.

This freewheel system can be placed in different positions in the transmission chain, it can be situated far upstream at the output of the motor shaft, in this case the freewheel will have to transmit a very low torque but at a high speed of rotation, or situated downstream of the reducing gear at the point of the mechanical connection with the crankset shaft, in this case the speed of rotation will be reduced but with a significantly higher level of torque to be transmitted. The latter embodiment corresponds to the first embodiment of the invention which will be described in detail hereinbelow.

In another configuration of the invention, the connection mechanism comprises a freewheel and a clutch. The clutch and the freewheel are not then necessarily adjacent in the motor-wheel transmission pathway. This configuration corresponds to the second embodiment of the invention.

In this other embodiment of the invention, the clutch mechanism can be of centrifugal clutch type which passes from the closed (engaged) position to the open (disengaged) position when the speed of rotation of the motor is less than a given speed V1. One of the ways of producing such a clutch mechanism is to make a clutch of centrifugal type which comprises a plurality of sectors, each equipped with friction pads that can come into contact with a friction cylinder. In open position, the friction pads are not in contact with the friction cylinder, whereas, in closed position, the sectors, subject to the centrifugal force, exert an effort on the friction cylinder such that the sectors and the friction cylinder are secured in rotation and that the motor can transmit a non-zero torque to the driving shaft.

Such a clutch mechanism can be placed at different points within the motor-wheel power transmission pathway. In one embodiment of the invention, the clutch mechanism is placed between the motor and the reducing gear.

The speed V1 is chosen such that V1/R is less than 25 rpm, R being the reduction ratio of the reducing gear.

BRIEF DESCRIPTION OF THE DRAWINGS

The invention will be better understood in light of the following description. The drawing attached thereto comprises:

FIG. 5 is a longitudinal cross-sectional view of the device of FIG. 3.

FIGS. 6 and 7 are, respectively, views in transverse cross section D-D and B-B of the device of FIG. 3 when the clutch mechanism is in closed position.

FIGS. 8 and 9 are, respectively, views in transverse cross section D-D and B-B of the device of FIG. 3 when the clutch mechanism is in open position.

FIG. 10 is a view in transverse cross section on the plane E-E.

DETAILED DESCRIPTION OF THE INVENTION

Figure 1:
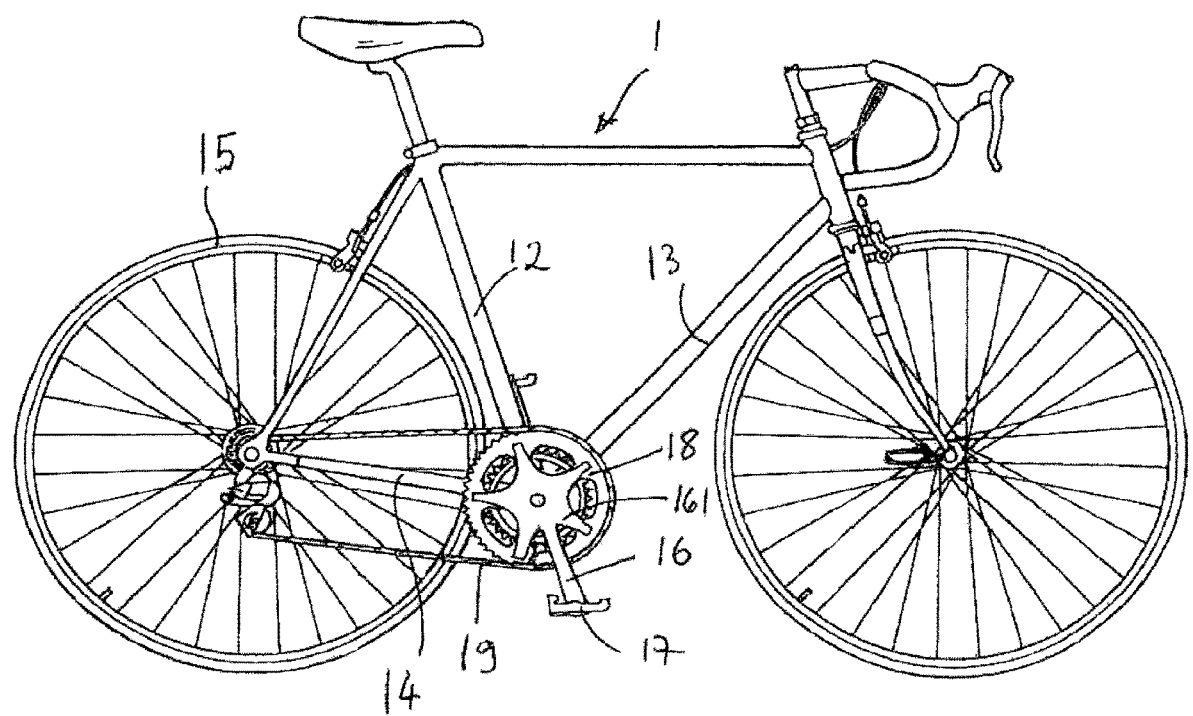
FIG. 1 is an overview of a bicycle incorporating an electric assist system according to an example of the invention.

FIG. 1 illustrates an electric assist bicycle 1 incorporating an assist system according to the present invention. As is known, this bicycle comprises a frame to which are fixed two wheels. The rear wheel 15 is the drive wheel and is driven by the crankset, consisting of a pair of cranks 16 and two pedals 17. The right crank comprises a star 161 whose ends serve as fixing for a toothed chain ring 18 of the transmission chain 19.

Figure 2:
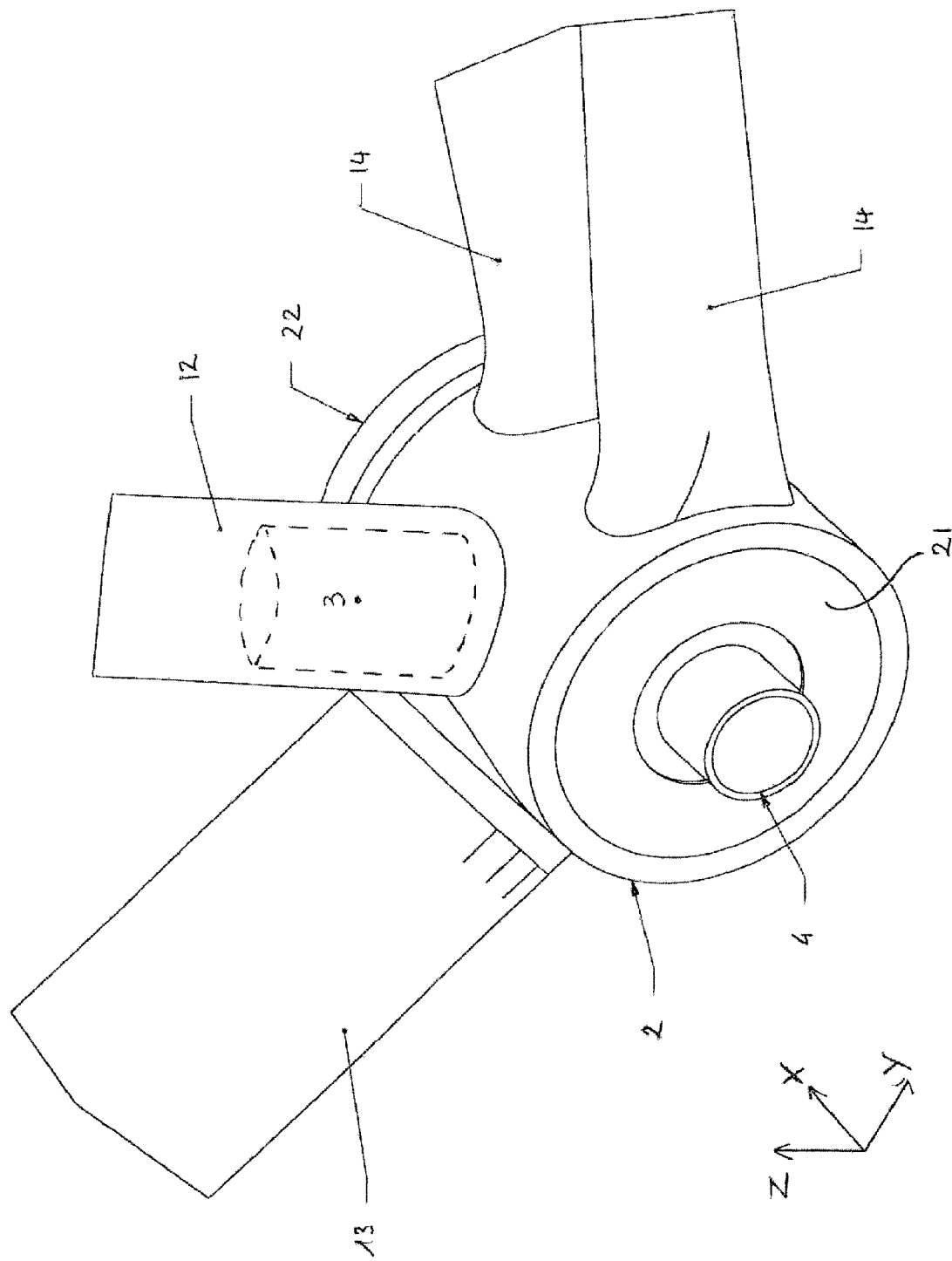
FIG. 2 is a view of an enlargement of a part of FIG. 1, centered on the housing of the crankset.

FIG. 2 shows the crankset 2 housing which forms an integral part of the frame and links the various tubes thereto. The assist motor 3 is housed inside an element forming the frame of the bicycle. It can for example be housed inside the seat tube 12, or in the oblique tube 13, or in one of the bases 14 linking the crankset to the hub of the rear wheel 5. Alternatively, the motor can be added onto the frame, for example by being fixed to one of these tubes 12, 13, 14 or by being fixed to the housing 2 of the crankset.

The motor 3 is an electric motor. It is preferably powered by a battery added onto the frame, or housed inside the frame, or even worn by the user. The motor 3 drives a motor member 31 in rotation.

Preferably, the motor member 31 is driven in rotation about the same axis of rotation as the output of the motor. This axis of rotation is at right angles to that about which the driving shaft 4 of the crankset turns. The axis of rotation of the crankset 4 and the axis of rotation of the motor 3 correspond, respectively, to the axes X and Z of the orthogonal reference frame illustrated in FIG. 2. Thus, the axis of rotation of the motor 3 is at right angles to that of the shaft 4 of the crankset.

Figure 3:
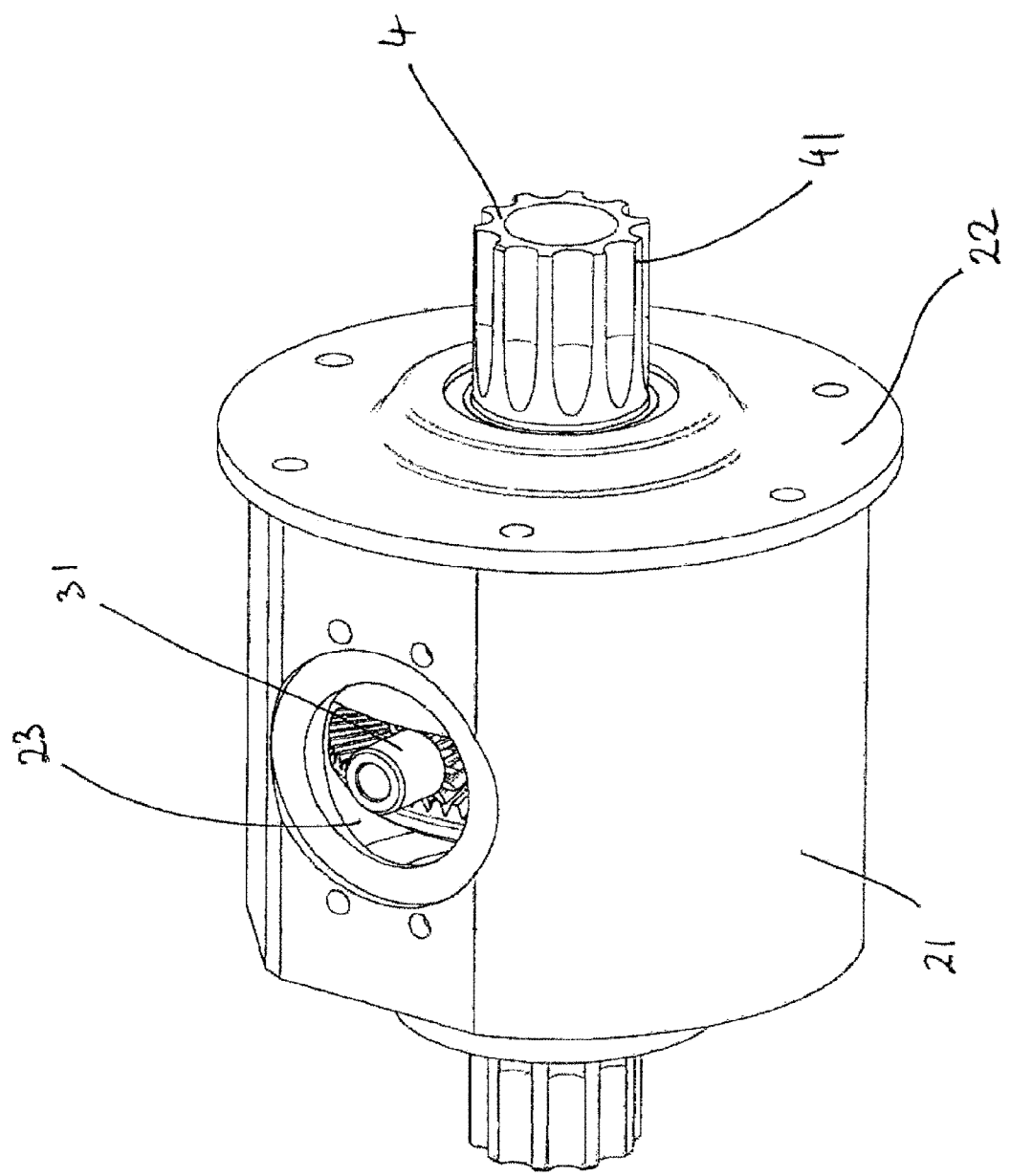
FIG. 3 is a perspective view of the device according to a first embodiment of the invention.

A casing 21 is housed inside the housing 2 and this casing is closed by a cover 22. The shaft 4 of the crankset passes right through the casing 21. FIG. 3 shows the casing 21 before it is inserted into the crankset housing. At each of its ends, the shaft 4 comprises means 41 allowing for the fixing of the cranks 17. In the case described here, these means consist of splines.

The casing 21 has a through opening allowing the passage of the shaft 4 of the crankset. In order to allow precise guidance and a good rigidity of the shaft 4 inside the housing 2, two rolling members 43, 44 are provided, typically ball bearings. These ball bearings are visible in FIG. 5.

The housing 2 and the casing 21 also have a top passage 23 allowing the motor member 31 to enter into the housing 2.

A reducing gear 5 makes it possible to transmit the efforts from the motor member 31 to the shaft 4 of the crankset. The reducing gear 5 is of epicyclic type with dual planet gear, in order to allow for a strong reduction ratio within a reduced volume.

The motor member 31 is a pinion which meshes with a crown ring 51 that is movable in rotation about an axis identical to that X of the shaft 4.

Preferably, the motor member 31 is a bevel pinion and the movable crown ring 51 bears beveled toothing complementing that of the motor member 31.

The crown ring 51 is mounted to rotate freely about the shaft 4 of the crankset. For that, rolling members can be provided, such as ball bearings 511, 512, disposed between the shaft 4 and the crown ring 51.

The movable crown ring 51 is secured in rotation to a planet carrier 52. Preferably, the movable crown ring 51 and the planet carrier 52 form one and the same piece. Alternatively, provision can be made for the crown ring and planet carrier to be distinct pieces secured to one another.

The planet carrier 52 has recesses configured to accommodate planet gears 53. There are preferably at least three of these planet gears 53 and they are configured to move in one and the same plane at right angles to the axis X of the shaft 4.

In this nonlimiting example, each planet gear is secured to a shaft mounted to rotate in a housing borne by the planet carrier 52. To this end, rolling bearings are provided, typically ball bearings, mounted between the shaft of the planet gear and the housing in order to minimize the friction losses of this reducing gear.

Each planet gear 53 comprises two pinions 531, 532. The two pinions 531, 532 of each planet gear 53 are placed parallel to one another and are secured to one another in their movement.

A first pinion 531 meshes with a fixed crown ring 54 secured to the casing 21 and therefore secured to the frame of the bicycle. This fixed crown ring 54 bears internal toothing. A second pinion 532 meshes with toothing borne by a second crown ring 55. The second crown ring 55 is secured with a driving piece 56 which constitutes the output of the reducing gear 5. The speed of rotation of the electric motor which can be several thousands of revolutions per minute is reduced until the output of the reducing gear is less than 100 rpm. For example, in the designed configuration, the reduction ratio of the bevel torque is 5 followed by the epicyclic reducing gear which has a ratio of 21, i.e. a total ratio of 105 between the speed of the motor and the output speed of the reducing gear.

The driving piece 56 is linked to the shaft 4 via the connection mechanism according to the invention. The latter comprises a declutchable freewheel 6, which comprises two pawls 61 and a synchronizing ring 62. The pawls 61 are mounted to pivot inside a housing 561 formed in the driving piece 56. They are kept there by virtue of a cage 57 fixed to the driving piece 56 by four screws. The pawls 61 pivot between an "engaged" position represented in FIG. 7, in which their distal end is engaged with one of the teeth 42 formed on the driving shaft 4, and a "disengaged" position represented in FIG. 9.

A synchronizing ring 62 synchronizes the swiveling movement of the two pawls 61. It is mounted to pivot about the axis X by virtue of a flange 562 which guides it. The synchronizing ring 62 has a small amplitude of rotation with respect to the driving ring 56. In fact, the synchronizing ring is fixed to the pawls at a distance of a few millimeters from their pivoting point.

The two pawls 61 are 180° opposed making it possible to balance the efforts transmitted by theoretically transmitting a pure torque with no radial component, and by substantially halving the effort transmitted by each of the pawls. The pawls preferably have an end with a beak engaging with teeth 42 formed on the shaft 4. Thus, as soon as the end of the pawl comes into contact with the shaft 4, the pawl will then continue its travel to engage automatically at the bottom of the tooth despite the frictions opposing its engagement, allowing them to remain perfectly stable once engaged, the synchronizing ring 62 mounted to pivot on the output of the reducing gear makes it possible to synchronize the rotation thereof in order for them to engage correctly simultaneously. FIGS. 7 and 9 show, in cross section B-B, the two pawls 61, and the synchronizing ring 62, in engaged position, respectively, in disengaged position.

Figure 4:
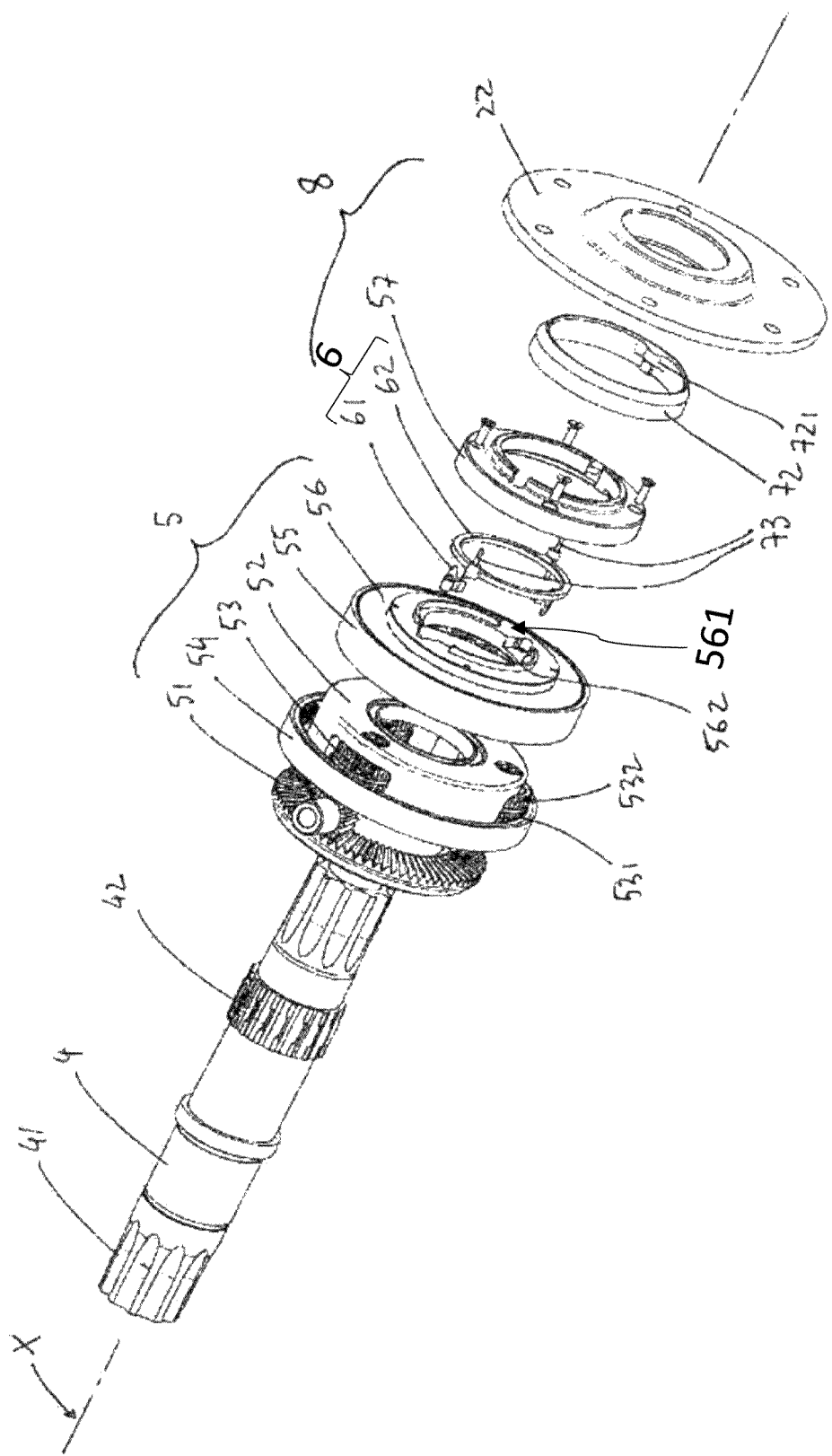
FIG. 4 is an exploded and partial perspective view of the device of FIG. 3.

The connection mechanism 8 also comprises means which allow the pawls 61 to be controlled, and notably allow them to be kept in disengaged position. These means comprise a friction ring 72 and two pins 73. FIGS. 4, 5 and 10 show the geometry and the operation of the friction ring 72. The friction ring is an elastically deformable ring which comes to bear prestressed on a fixed part of the device on at least two zones. In the embodiment represented, the fixed part is a cylindrical barrel 221, protruding from the internal face of the cover 22. This ring comprises two diametrically opposed buttons 721 formed on the internal face of the ring. These buttons are provided to slip over the outer surface of the barrel 221 deriving from the cover 22. The friction ring 72 is secured in rotation to the synchronizing ring 62 via two pins 73 that are inserted into two diametrically opposite, radially oblong holes. To ensure a certain grip of the friction ring on the barrel 221, the internal diameter between the two buttons is, in the free state, slightly less by approximately 0.5 mm than the outer diameter of the barrel 221. The fitting of the friction ring will generate a certain out-of-roundness of the latter, the geometry of this friction ring must be dimensioned to generate two diametrically opposite radial efforts when it becomes out-of-round by 0.5 mm without generating high stresses on the latter in order for it to be able to withstand this level of stress without creep throughout the life of the product. It will be possible to choose a material of PBT or POM type to produce the ring because this friction piece must have a very good resistance to wear, and a very good elasticity, as well as a good behavior at the operating temperature to guarantee a very good stability of its clamping prestress throughout the lifetime of use of the product.

The diametral clamping of this friction ring 72 onto the barrel 221 will induce a stable and controlled friction torque opposing the rotation of the latter with respect to the barrel 221 which is itself linked to the housing of the frame 1.

As an example, very good operation is obtained by dimensioning the friction ring to obtain two diametrically opposite radial efforts at the friction buttons of approximately 5N under a diametral clamping of 0.5 mm with a stress level of less than 10 MPa on the latter, thus avoiding any risk of relaxation or creep over time, these radial efforts generated on the barrel of 35 mm diameter make it possible to generate a friction torque of approximately 25 mN.m in both directions of rotation, more than sufficient to engage and disengage the pawls, while generating a torque that is low enough not to induce any significant power loss upon the slippage of the latter, since this friction torque of 25 mN.m generates a loss only of 0.2 watt at 80 revolutions per minute, which is negligible compared to the assist power and which does not make it possible to heat up and wear the zone of the buttons in contact with the barrel 221. The operation of the clutch mechanism will now be described in detail.

When the output of the reducing gear, that is to say the driving ring 56, is driven in the positive direction (normal direction of pedaling identified with a + sign in the figures), the synchronizing ring 62 will be driven in rotation in the same direction and it will drive with it the friction ring 72, the friction of the two buttons 721 on the barrel of the cover 22 will generate a friction torque which will be transmitted to the synchronizing ring 62. Since the latter has a certain amplitude of relative rotation with respect to the driving ring 56, the friction torque will cause it to be forced in the direction opposite the movement and therefore make it turn backward relative to the output of the reducing gear. This relative rotation tends to cause the pawls to pivot in their direction of engagement provoking the connection in rotation of the motor with the driving shaft 4. The freewheel is then engaging. This state of engagement of the freewheel is represented in FIGS. 6 and 7. That corresponds to the state 1 of the connection mechanism, called assist state, or even to the assisted pedaling mode (phase 2) when the cyclist pedals less quickly than that of the assistance provided by the motor.

In the case where the cyclist increases his or her pedaling rate to exceed the output speed of the reducing gear (phase 3), the teeth 42 of the shaft 4 will lift the pawls 61 on each passage of teeth and no torque will be transmitted between the driving ring and the shaft 4. The freewheel is then free to slip. This is the conventional operation of a freewheel. That corresponds to the state 2, called freewheel state, of the connection mechanism. It can be noted that, when the pawl is lifted by a tooth 42 of the shaft 4, the synchronizing ring 62 and the friction ring 72 will thus assume a slight advance relative to the driving ring but the friction torque of the friction ring provoked by the friction of the buttons 721 on the cover 22 will remain substantially constant, provoking the immediate reengagement of the pawls as soon as the tooth 42 is passed, so, in this freewheel phase, the friction ring acts in a way analogous to the return springs of the conventional ratchet freewheels.

Now, if the cyclist decides to backpedal (phase 5), the shaft 4 which turns in the negative direction will drive, via the pawls, the driving ring 56 and the friction ring 72. The friction of the buttons 721 with the cover 221 generates a friction torque which opposes the rotation and makes the synchronizing ring turn relative to the driving ring until the two pawls are lifted, making the motor coupling impossible. The connection mechanism is then in state 3, called disconnection state, as represented in FIGS. 8 and 9.

Indeed, this declutching of the pawls is linked to the direction of relative rotation between the crown ring of the reducing gear and the cover of the crankset housing (fixed), so it will be possible to control the engagement of the pawls by controlling the direction of rotation of the motor such that it is sufficient to order a small reverse rotation of the motor to make the driving ring 56 pivot by at least a few degrees backward, that is to say in the negative direction, to declutch the freewheel.

In practice, if the cyclist is moving forward with motor assist (phase 2), the pawls are then engaged. From this state, if the cyclist decides to suddenly reverse (phase 5), or stop pedaling to be able to stop (phase 4), since the pawls have engaging beaks, it can be possible for the pawls not to be able to easily disengage despite the friction torque applied to the synchronizing ring, and for that it is desirable for a controlling microcontroller (not represented) to be able to detect this event either by a sensor of pedaling torque (not represented) which suddenly becomes zero or negative, or by a zero speed of rotation of the crankset detected by an angular sensor (not represented), or by a strong angular deceleration or even by a reversal of the direction of rotation of the motor or of the crankset and then order a reverse rotation of the motor with a greater reverse acceleration than that of the cyclist for a fraction of revolution which will disengage the ratehets pawls and allow them to lift, this reverse motion will be able to be stopped almost immediately and the freewheel will then remain in this stable disengaged state without inducing the slightest friction or the slightest additional noise for the cyclist.

Finally, when the cyclist decides to switch from assistance or when the battery is drained (phase 1), the microcontroller will order a reverse rotation of the motor in order to place the freewheel in the disengaged state. Thus, the presence of the assist device induces no additional friction or noise.

In a variant embodiment of the first embodiment of the invention, a spring placed between the driving ring 56 and the synchronizing ring 62 keeps the pawls in the disengaged position, for an absence of rotation or a negative rotation of the friction ring. The return torque of the spring must be less than the friction torque of the friction ring in order for a rotation of the latter in the positive direction to correctly provoke the engagement of the pawls. Thus, if the cyclist backpedals, he or she will disengage the pawls which will then, by virtue of the spring, be in a stable disengaged position (state 3). In this variant, the control of the motor in reverse is not necessary.

FIGS. 11 to 15 describe a second embodiment of the invention in which the connection mechanism 8 comprises a freewheel 6 and a clutch mechanism 7 that are distinct.

Furthermore, the freewheel and clutch are not directly adjacent in the motor-wheel power transmission pathway. In fact, as will be seen later, a reducing gear 5 is inserted between the clutch and the freewheel. This embodiment differs also in that the assist motor 3 is a concentric motor with driving shaft 4. It is clearly understood that the type and the disposition of the motor are not limiting in the context of the invention and that the first embodiment described above could very well be equipped with a concentric motor with driving shaft.

Figure 11:
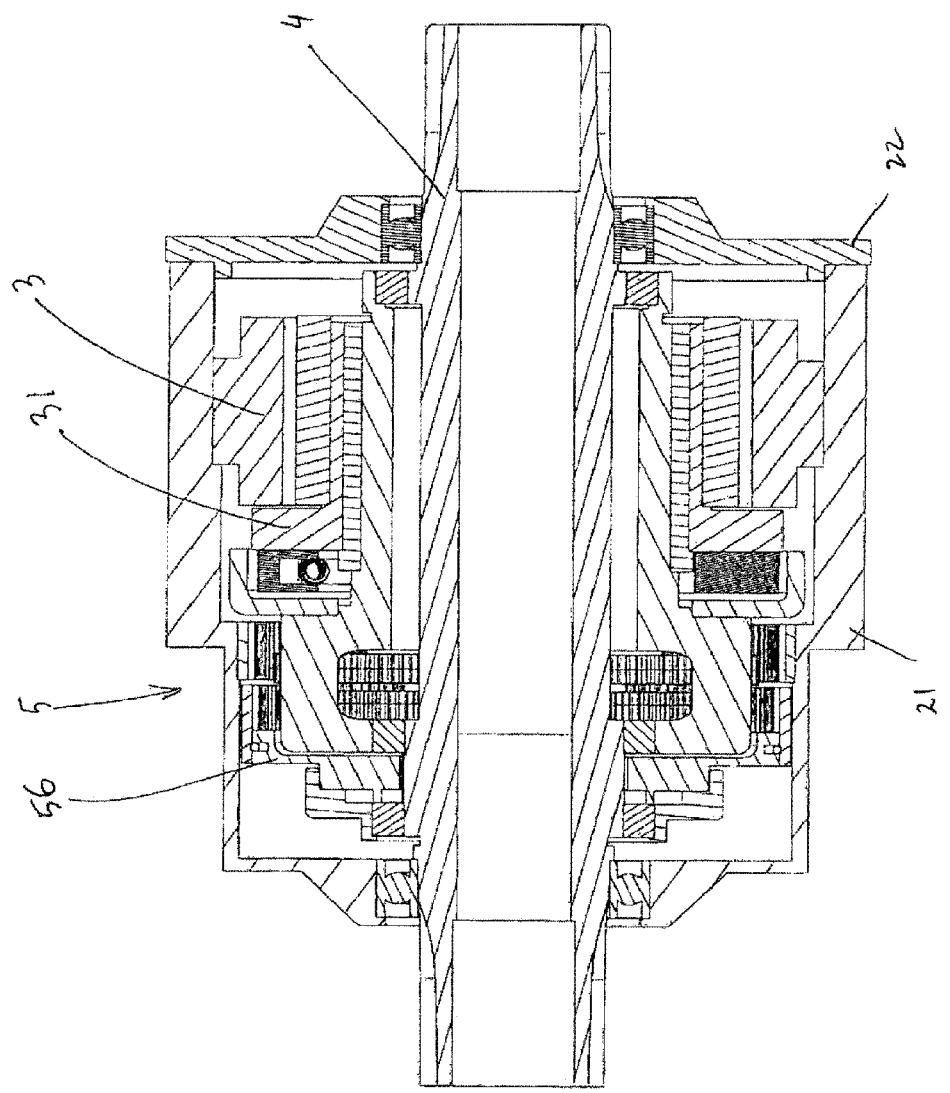
FIG. 11 is a view in longitudinal cross section of a device according to a second embodiment of the invention.
Figure 12:
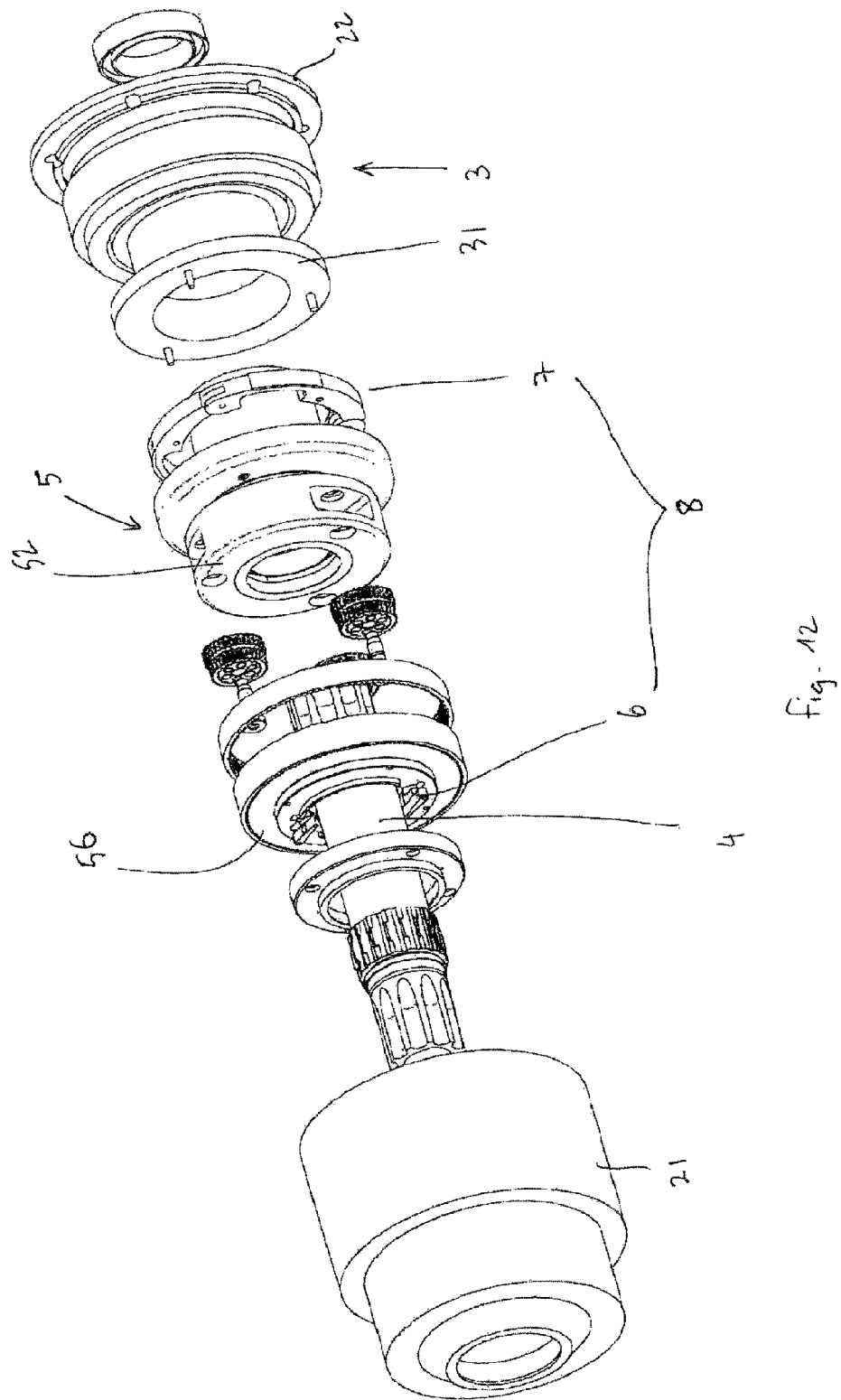
FIG. 12 is an exploded and partial perspective view of the device of FIG. 11.
Figure 13:
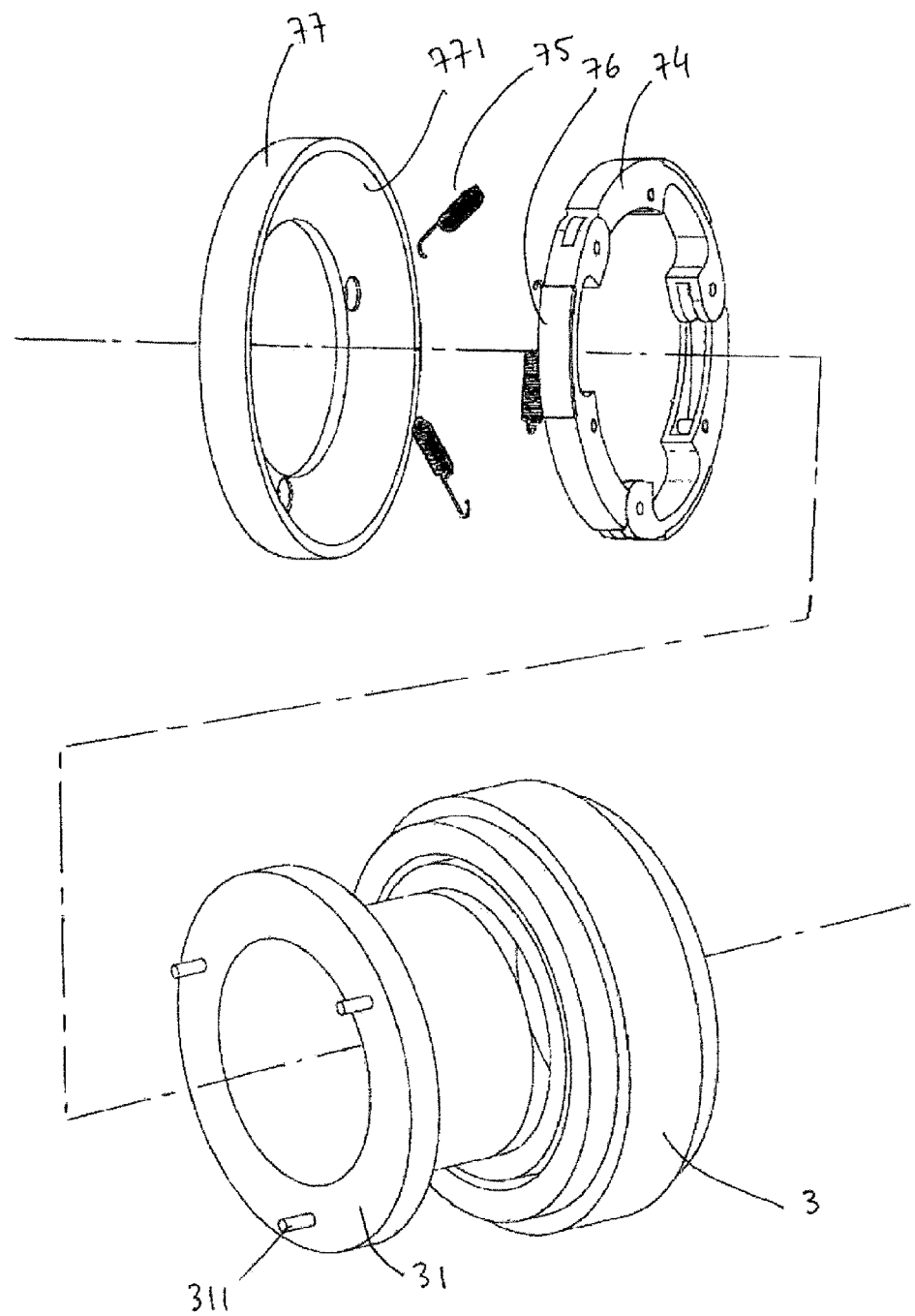
FIG. 13 is a detail view of FIG. 12.

FIG. 11 shows, in longitudinal cross section, the complete block before the latter is inserted into the crankset housing of the bicycle as is shown in FIG. 2. All of the elements are housed inside a casing 21 closed by a cover 22. The motor 3 drives the motor member 31 in rotation. The latter comprises three pins 311 protruding from its front-end surface which allow the reducing gear 5 to be driven through a clutch mechanism 7, the operation of which will be explained hereinbelow.

The reducing gear 5 in this embodiment is substantially identical to that described with the first embodiment. It will not be described again in detail. This is a reducing gear that has a reduction ratio R which is equal to 41 in this second embodiment. The input of the reducing gear is through the planet carrier 52 and the output of the reducing gear 5 consists of a driving ring 56 which drives the shaft 4 through a simple freewheel 6. This is a simple ratchet freewheel that is substantially identical to that described for the first embodiment of the invention, but in which the pawls are engaged in traditional manner, each by a small spring in their position of engagement.

Figure 14:
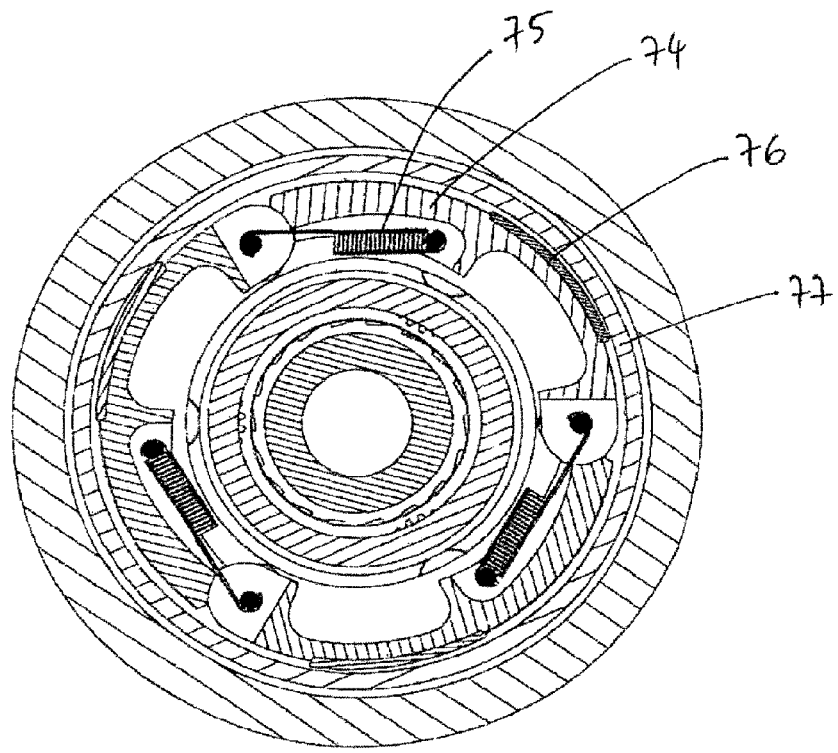
FIG. 14 is a view in transverse cross section F-F, when the clutch mechanism is in closed position.
Figure 15:
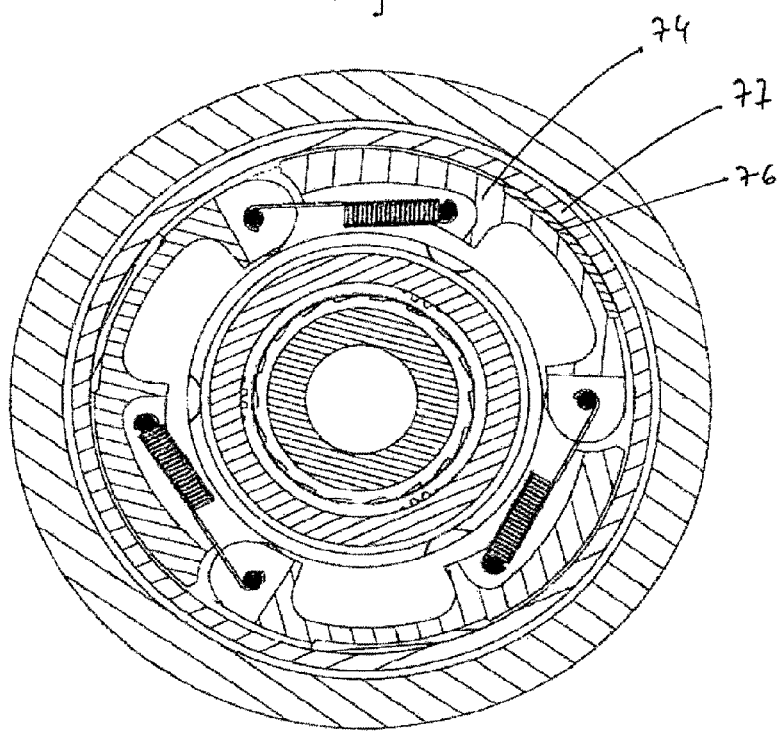
FIG. 15 is a view in transverse cross section F-F, when the clutch mechanism is in open position.

The clutch mechanism 7 comprises a clutch ring 77 and three sectors 74 housed inside said ring and distributed over the entire circumference. The clutch ring 77 is secured to the planet carrier 52. Each sector is mounted to pivot on a pin 311 and is stressed by a return spring 75 which links it to another pin. A friction pad 76 covers, at least partially, the periphery of each of the sectors 74. The springs 75 are chosen such that, when the clutch 7 is not rotating, the return force of the springs 75 stresses the sectors 74 toward the shaft 4 as can be seen in FIG. 14.

When the motor is not rotating, or rotating at a low speed, there is no contact, or no sufficient friction, between the friction pads 76 and the friction cylinder 771 of the clutch ring 77, and the clutch is open. The motor 3 is then no longer secured in rotation, with the reducing gear 5, and consequently the driving shaft, and this is so in both directions of rotation.

When the motor starts up at a sufficiently high speed, it drives the sectors, which, subjected to the centrifugal force, pivot about the pins 311. The centrifugal force which is exerted on the sectors then exceeds the return force of the springs and the friction pads are pressed against the friction cylinder 771 of the clutch ring. The speed of the motor is then V1, which is the wheel spin start speed. The centrifugal efforts exerted on the sectors increase with the square of the speed, the efforts generated on the friction pad will very quickly allow the clutch to stop the slipping of the latter with respect to the friction cylinder. The speed of the motor is then V2, that is to say the end of wheel spin speed at the maximum torque of the motor. The configuration described in FIG. 15 then applies. This configuration corresponds to the closed position of the clutch mechanism in which the motor is completely secured to the reducing gear 5 and the driving shaft 4.

The operation of a bicycle equipped with an assist device according to the second embodiment of the invention is detailed hereinbelow.

When the cyclist does not want assistance or when the battery is drained (phase 1), the centrifugal clutch 7 is open and the motor 3 is separated from the driving shaft 4. The motor-wheel transmission pathway is broken. That corresponds to the state 3 of the connection mechanism 8. Consequently, the motor cannot in any case be damaged by a rotation of the pedals, whatever the speed at which the latter are turned.

When the cyclist wants to benefit from the assistance and when the motor is running, the rotation of the motor at a speed greater than a given speed V2, for example 500 revolutions per minute, sets the clutch in closed position. The motor 3 contributes to the driving of the shaft 4 with the pedals (phase 2). That corresponds to the state 1 of the connection mechanism. If the cyclist pedals at a faster rate than that which the motor 3 can supply to the shaft 4, then the freewheel 6 is disconnected. In this configuration, the motor no longer contributes to the driving of the shaft (phase 3), and the connection mechanism is in the state 2.

When the cyclist stops pedaling (phase 4), a pedaling rate sensor informs the microcontroller of this and the microcontroller stops the motor. As soon as the rotation of the latter passes below the value V1, the clutch 7 switches to open configuration.

If, during use with assistance, the cyclist reverses with the pedals (phase 5), the transition from the speed of rotation of the crankset through a zero speed (and consequently less than V1) has the effect, as for phase 4, of opening the clutch and disconnecting the motor. The connection mechanism switches to the state 3. In these latter two cases, the state 3 of the connection mechanism is an unstable transient state because, as soon as the motor is once again driven at a speed V1, the connection mechanism switches back to the state 1.

In practice, the speed V1 is chosen such that, when the motor turns at the speed V1, the shaft 4, the speed of which is V1/R, is between 1 and 25 rpm. These speeds do not correspond to usual pedaling rates, which lie between 30 and 110 rpm. In the example represented here, the ratio of the reducing gear R being equal to 41, the speed V1 is between 41 and 1025 rpm.

The designer must determine the mechanical characteristics of the sectors and of the springs in order, when the motor turns at the speed V2, for 100% of the maximum torque of the motor to be transmitted, that is to say that there is no longer any slip. Preferably, the speed V2 corresponds to a speed of the shaft 4, V2/R, of approximately 40 rpm. In the example represented, V2 is approximately 1640 rpm. When the motor turns at a speed greater than V2, there is an assurance that there will not be any wheel spin, that is to say slip, and therefore overheating and loss of energy.

The invention claimed is:

1. An electric assist device for a bicycle comprising:
   a shaft secured in rotation with a pair of cranks and configured to be driven in rotation in a positive direction by an electric motor; and
   a connection mechanism between the motor and the shaft, the connection mechanism comprising either a declutchable freewheel or a freewheel and a clutch so that the connection mechanism has at least three distinct states:
   state 1, called assist state, in which the motor transmits a torque to the shaft via a driving piece which turns at a same speed as the shaft, state 2, called free-wheel state, in which the rotation of the shaft in the positive direction is greater than that of the driving piece, and state 3, called disconnection state, in which a rotation in the positive direction of the shaft cannot drive the rotation of the motor and a rotation in a negative direction of the shaft cannot drive the rotation of the motor.

2. The device as claimed claim 1, wherein the cranks are fixed to two ends of the shaft.

3. The device as claimed in claim 1, wherein a reducing gear is placed between the motor and the shaft so as to reduce a speed of rotation of the motor.

4. The device as claimed in claim 3, wherein the reducing gear comprises a gear train.

5. The device as claimed in claim 4, wherein the reducing gear is an epicyclic reducing gear.

6. The device as claimed in claim 3, wherein the connection mechanism comprises the freewheel and a clutch mechanism that includes the clutch, which is of a centrifugal clutch type which passes from a closed position to an open position when a speed of rotation of the motor is less than a given speed V1.

7. The device as claimed in claim 6, wherein the clutch mechanism comprises a plurality of sectors, each equipped with friction pads that can come into contact with a friction cylinder and in that, in open position, the friction pads are not in contact with the friction cylinder, whereas, in the closed position, the sectors, subjected to the centrifugal force, exert an effort on the friction cylinder such that sectors and friction cylinder are secured in rotation and that the motor can transmit a non-zero torque to the shaft.

8. The device as claimed in claim 7, wherein the reducing gear has a reduction ratio R, wherein, when the speed of rotation of the motor is less than V1, the clutch mechanism is in open position, said speed V1 being such that V1/R<25 rpm.

9. The device as claimed in claim 6, wherein the clutch mechanism is placed between the motor and the reducing gear.

10. The device as claimed in claim 9, wherein the reducing gear has a reduction ratio R, wherein, when the speed of rotation of the motor is less than V1, the clutch mechanism is in open position, said speed V1 being such that V1/R<25 rpm.

11. The device as claimed in claim 6, wherein the reducing gear has a reduction ratio R, wherein, when the speed of rotation of the motor is less than V1, the clutch mechanism is in open position, said speed V1 being such that V1/R<25 rpm.

12. The device as claimed in claim 1, wherein the connection mechanism comprises blocking pieces that are displaced between an "engaged" position and a "disengaged" position and a mechanism allowing the blocking pieces to be kept in disengaged position.

13. The device as claimed in claim 12, wherein the blocking pieces are pawls whose distal ends can engage with teeth integral to the shaft when the pawls are in engaged position.

14. The device as claimed in claim 13, wherein the mechanism allowing the pawls to be kept in disengaged position comprises a ratchet synchronization ring and a friction ring, secured to one another, said friction ring coming into contact with a fixed part of the assist device so as to generate a friction torque during its rotation.

15. The device as claimed in claim 14, wherein, upon a rotation of the friction ring in the positive direction, the friction ring generates a torque which tends to engage the pawls and, conversely, upon a rotation in the negative direction, the friction ring generates an opposite torque which tends to disengage the pawls.

16. The device as claimed in claim 14, wherein the friction ring is an elastically deformable ring bearing with prestress on the fixed part of the device on at least two zones.

17. An electric assist method for a bicycle equipped with a device that includes
   a shaft secured in rotation with a pair of cranks and configured to be driven in rotation in a positive direction by an electric motor, and
   a connection mechanism between the motor and the shaft, the connection mechanism comprising either a declutchable freewheel or a freewheel and a clutch so that the connection mechanism has at least three distinct states:
      state 1, called assist state, in which the motor transmits a torque to the shaft via a driving piece which turns at a same speed as the shaft,
      state 2, called free-wheel state, in which the rotation of the shaft in the positive direction is greater than that of the driving piece, and
      state 3, called disconnection state, in which a rotation in the positive direction of the shaft cannot drive the rotation of the motor and a rotation in a negative direction of the shaft cannot drive the rotation of the motor, the electric assist method comprising:
   controlling, by a microcontroller, the rotation of the motor in a first direction, called positive direction, when assistance is desired by a user, said positive direction being such that it generates a forward motion of the bicycle, and, when a speed of rotation of the cranks is zero or when the cranks turn in the direction opposite to the forward motion of the bicycle, controlling the rotation of the motor in the direction opposite the first direction, for a short time period.

* * * * *